No. 690,890. Patented Jan. 7, 1902.
D. T. BLEVINS & D. H. TAYLOR.
CLOTHES LINE TIGHTENER AND ADJUSTER.
(Application filed July 6, 1901.)
(No Model.)
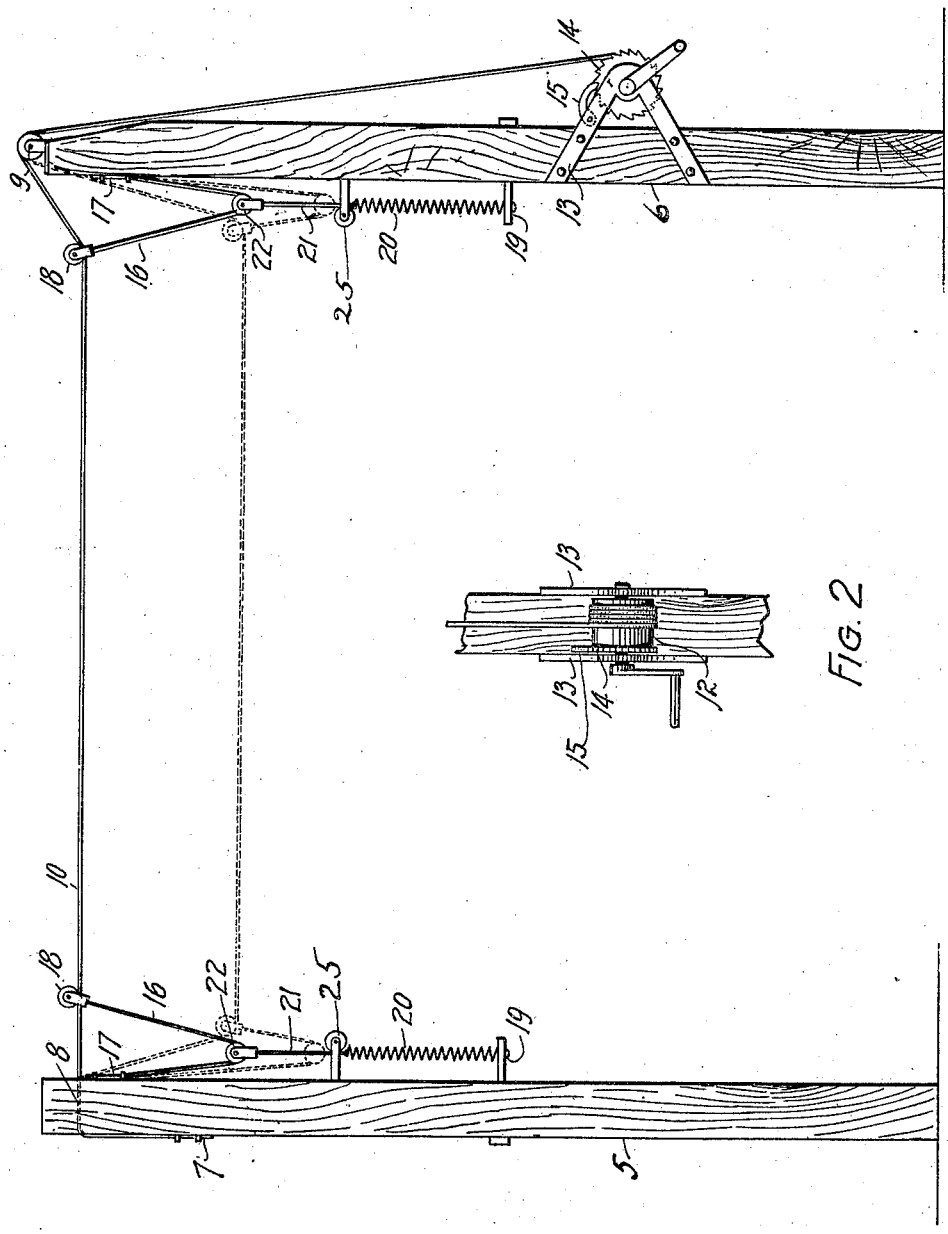

UNITED STATES PATENT OFFICE.

DAVID T. BLEVINS AND DAVID H. TAYLOR, OF NEW WINDSOR, COLORADO.

CLOTHES-LINE TIGHTENER AND ADJUSTER.

SPECIFICATION forming part of Letters Patent No. 690,890, dated January 7, 1902.

Application filed July 6, 1901. Serial No. 67,354. (No model.)

*To all whom it may concern:*

Be it known that we, DAVID T. BLEVINS and DAVID H. TAYLOR, citizens of the United States of America, residing at New Windsor, in the county of Weld and State of Colorado, have invented certain new and useful Improvements in Clothes-Line Tighteners and Adjusters; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in clothes-line tighteners and adjusters, our object being to provide a device by virtue of which the line may be raised and lowered at pleasure and kept taut and practically straight regardless of its position; and to this end the invention consists of the features, arrangements, and combinations hereinafter described and claimed, all of which will be fully understood by reference to the accompanying drawings, in which is illustrated an embodiment thereof.

In the drawings, Figure 1 is a side elevation of our improved device applied to a clothes-line. Fig. 2 is a detail view of the winding-drum and ratchet-lock viewed at right angles to Fig. 1.

The same reference characters indicate the same parts in all the views.

Let the numerals 5 and 6 designate two posts suitably separated to properly correspond with the desired length of the line 10. One extremity of the line is secured to the post 5 on the outside, as shown at 7. From this point the line is carried upwardly and passed through an opening in the post, as shown at 8. The line is then carried over to the next post and passed over a pulley 9, mounted on the top thereof, and thence down on the outside of the post to the drum 12, which is journaled in the brackets 13, secured to the post 6 on opposite sides. To this drum is secured a ratchet wheel or disk 14, which is engaged by a pawl or dog 15, pivotally mounted on one of the brackets 13.

The manner of attaching the line to the post, as above explained, may be varied at will and as circumstances may require.

To each post is secured, as shown at 17, one extremity of a cord, wire, or other suitable flexible device 16, whose opposite extremity is provided with a pulley 18, engaging the line 10 from above. To each post is attached, as shown at 19, the lower extremity of a coil-spring 20, to whose upper extremity is attached a cord or other suitable device 21, provided at the top with a pulley 22, engaging the cord 16 intermediate the pulley 18 and its fastened extremity 17. Each post is provided with a guide-pulley 25 for the cord 21.

The line is raised to the full-line position in Fig. 1 by turning the drum 12 and winding the line 10 thereon sufficiently for the purpose, the drum being held in the adjusted position by the engagement of the dog 15 with the ratchet on the drum. As the line is raised by this action the springs 20 are placed under tension, and the line is held taut. When it is desired to take clothes off or put them on the line, the latter may be lowered by simply disengaging the dog 15 from the ratchet and unwinding the drum until the line is properly lowered. The springs are of such strength and so arranged that when the line is lowered to the dotted-line position in Fig. 1 the tension of the springs 20 still holds it taut to support the clothes that may be placed thereon. In other words, as the drum is unwound the springs 20, in conjunction with the cords 16, take up the slack of the line, holding it tight. By our special arrangement of the cords 16 and their connection with the pulleys 22, whereby the cords are doubled, the vertical expansion and contraction of the spring is only half the vertical movement of the line 10, during the operation of raising and lowering the line.

Having thus described our invention, what we claim is—

1. In a clothes-line tightener and adjuster, the combination with suitable stationary supports, and a line, the latter being made fast at one extremity to one of the supports, of a winding-drum to which the other extremity of the line is secured, a suitable locking device for holding the drum in the adjusted position, a pulley mounted on one of the supports and engaged by the line, a flexible device attached at one extremity to one support and provided at its opposite extremity with a device engaging the line and arranged to travel thereon, an antifrictional device engaging the flexible device between its extremities, and a yieldingly-retained connection between one of the supports and the antifrictional device.

2. In a device of the class described, the combination with a line and suitable supports, of a pulley mounted on one support, a winding-drum mounted on the same support, the line being made fast at one extremity to a support, passing over the pulley of the other support, and connected with the drum to wind thereon, a flexible device attached at one extremity to one support and provided at its opposite extremity with a device engaging the line and arranged to travel thereon, a coiled spring attached to a post, and an antifrictional device connected with the said spring and engaging the flexible device between its extremities.

3. In a device of the class described, the combination with a line and suitable stationary supports, of a pulley mounted on the upper part of one support, a winding-drum mounted below the pulley, the cord being attached at one extremity to the other support and passing over the pulley of the opposite support, its opposite extremity being attached to the drum, a flexible device attached at one extremity to one support and provided at its opposite extremity with a device engaging the line and arranged to travel thereon, an antifrictional device engaging the flexible device between its extremities, and a spring-held connection between one of the posts and the antifrictional device.

4. The combination with the line and suitable stationary supports, of a winding device mounted on one support, to which the line is attached, the line being also attached to the other support, a flexible device attached at one extremity to one support, and provided with a pulley engaging the line at its opposite extremity, and a suitable device movably attached to the flexible device between its extremities, for taking up the slack and holding the line taut as the line is released by unwinding.

5. The combination with a line and suitable stationary supports, of a winding device mounted on one support, to which device the line is attached, the line being also attached to the other support, a flexible device attached at one extremity to one support and provided with a pulley engaging the line at its opposite extremity, a spring attached to a support, and a pulley connected with the spring and engaging the flexible device intermediate its extremities.

6. The combination with a line and suitable stationary supports, of a winding device mounted on one support, to which the line is attached, the line being also attached to the other support, a flexible device attached at one extremity to each support and provided at its opposite extremity with a pulley engaging the line, a spring attached to each support, and a pulley connected with each spring and engaging the flexible device intermediate its extremities.

7. The combination with a line and suitable stationary supports, of a winding device mounted on one support, to which the line is attached, the line being also attached to the other support, a flexible device attached at one extremity to each support and provided at its opposite extremity with a pulley engaging the line, a spring attached to each support, a pulley engaging the flexible device, a flexible connection between the last-named pulley and the spring, and a guide-pulley mounted on each support and engaging said flexible connection.

In testimony whereof we affix our signatures in presence of two witnesses.

DAVID T. BLEVINS.
DAVID H. TAYLOR.

Witnesses:
G. H. PETERSON,
R. E. HANNA.